United States Patent Office 2,919,695
Patented Jan. 5, 1960

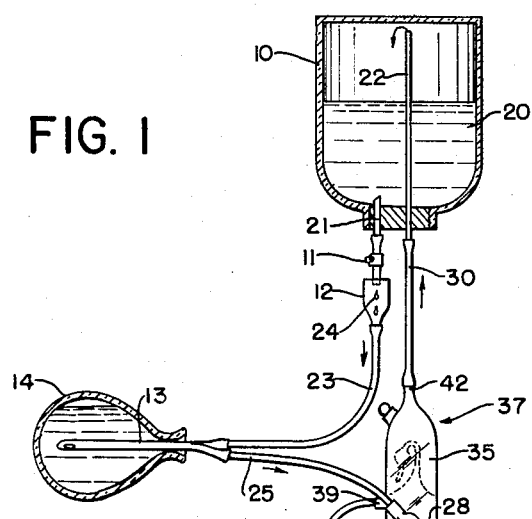
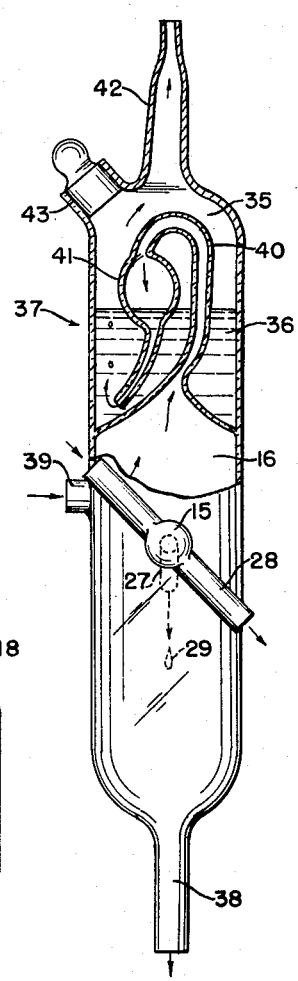
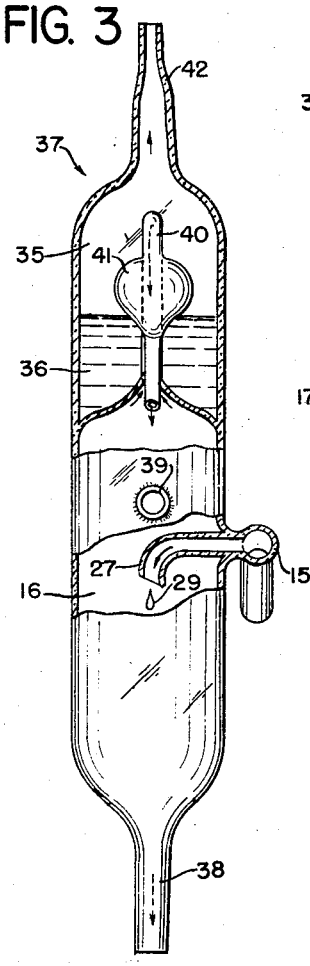

2,919,695

CONTINUOUS IRRIGATION APPARATUS

Se Kyong Kim, Bronx, N.Y.

Application December 9, 1958, Serial No. 779,164

8 Claims. (Cl. 128—227)

This invention relates to the irrigation of the bladder, kidney, pelvis and other organs, and more particularly to a new apparatus for the continuous irrigation of such organs.

There are many cases in which continuous irrigation of the bladder or upper urinary tract is indicated, such as, for example, in cases of the bladder, prostate or bladder-neck surgery in which free drainage of the bladder must be maintained following surgery, in cases of chronic urinary infection which is resistant to oral antibiotic therapy, in cases which require indwelling ureteral catheters, and the like. Continuous irrigation of the bladder and similar organs is accomplished by providing means by which an irrigating fluid, for example, saline solution, antibiotic solutions and the like, can slowly and continuously be introduced into the organ, and means by which the irrigating fluid together with any other fluids present in the organ can be withdrawn or drained from the organ. The conventional continuous irrigation apparatus comprises a fluid supply bottle containing the irrigating fluid, means for regulating the flow of fluid from the fluid supply bottle, a plastic or rubber tube connecting the fluid supply bottle to the inlet tube of a two-way catheter, a drainage bottle, and a plastic or rubber tube connecting the outlet tube of the two-way catheter to the drainage bottle. Occasionally it is desirable to employ a combination of a suprapubic catheter and a conventional ureteral catheter in place of the aforementioned two-way catheter, the suprapubic catheter serving as the irrigating fluid inlet tube and the urethral catheter serving as the drainage fluid outlet tube. Accordingly, in the interest of simplicity, the term "two-way catheter" as employed herein will be understood to refer not only to true two-way catheters but also to the aforementioned combination of suprapubic and urethral catheters and to all such equivalent arrangements as well.

This arrangement works well as long as the drainage fluid outlet tube of the two-way catheter remains unblocked so that the drainage fluid can flow freely from the organ being irrigated. However, should the drainage fluid outlet of the catheter become occluded, for example by being clogged or blocked by a blood clot, mucus or a bit of tissue, the drainage fluid can no longer flow freely from the organ. Should this occur, the flow of irrigating fluid must be immediately shut off in order to avoid possible serious consequences. As a result, conventional continuous irrigation apparatus must be constantly watched so that the flow of irrigating fluid can be shut off whenever the flow of drainage fluid ceases due to occlusion of the drainage tube.

To avoid the possible serious consequencies resulting from occlusion of the drainage tube without shutting off the flow of irrigating fluid, and to obviate the necessity for constant observation of the irrigation apparatus, I have devised means for controlling the flow of irrigating fluid which, when connected to the drainage tube of the two-way catheter, shuts off the flow of irrigating fluid whenever the flow of drainage fluid stops for any reason. My new fluid flow control means comprises a proportionator device adapted to divert and direct to an associated pressure equalizer chamber and fluid collection bottle an amount of the drainage fluid equal to the amount of irrigating fluid withdrawn from the irrigating fluid supply bottle and to direct the balance of the drainage fluid through an overflow conduit to an excess drainage fluid bottle. The proportionator device and the associated equalizer chamber and bottle are closed to the surrounding atmosphere, and the atmosphere within the equalizer chamber and bottle is connected by a conduit to an air inlet opening communicating with the atmosphere within the irrigation fluid supply bottle which is also closed to the surrounding atmosphere. The excess drainage fluid bottle is open to the atmosphere and is provided with a liquid seal adapted to prevent entrance of atmospheric air into the proportionator device and associated equalizer chamber through the overflow conduit connected thereto. In addition, the conduit connecting the equalizer chamber to the irrigation fluid supply bottle advantageously is provided with means for sterilizing the air flowing from the equalizer chamber to the supply bottle.

In the preferred embodiment of my invention the proportionator device, the pressure equalizer chamber and the air sterilization means are combined in a new and unique piece of apparatus referred to herein as the fluid flow control device. The proportionator of the fluid flow control device of my invention diverts and directs to the equalizer chamber of the device an amount of the drainage fluid equal to the amount of irrigating fluid withdrawn from the irrigation fluid supply bottle and directs the balance of the drainage fluid to the excess drainage fluid bottle. The drainage fluid introduced into the pressure equalizer chamber flows therefrom through a conduit to a separate fluid collection bottle. A second conduit connects the air space within the collection bottle to the pressure equalizer chamber of my fluid flow control device so that the air pressure within the equalizer bottle and within the pressure equalizer chamber is always the same. The equalizer chamber of the fluid flow control device also communicates with the air sterilization means of the device so that the air passing from the equalizer chamber to the irrigation bottle will be sterilized.

My improved apparatus for continuous irrigation of the bladder and similar organs will be better understood from the following description taken in conjunction with the accompanying drawings of which Fig. 1 is a schematic view of a continuous irrigation apparatus embodying my invention;

Fig. 2 is a front elevation of an advantageous embodiment of the fluid flow control device of my invention; and Fig. 3 is a side elevation of the fluid flow control device shown in Fig. 2.

Referring now to Fig. 1, the preferred embodiment of the apparatus of my invention comprises, in its major components, an irrigation fluid supply bottle 10, means 11 and 12 and for regulating and determining the rate of flow of irrigating fluid from the fluid supply bottle, a two-way catheter 13 connected to the fluid supply bottle 10 and adapted to be inserted into the organ 14 being irrigated, a proportionator device 15 connected to the drainage fluid outlet passageway of the two-way catheter, an air pressure equalizer chamber 16 connected to the proportionator device and to the irrigation fluid supply bottle, an equalizing fluid collection bottle 17 connected to the air pressure equalizer chamber 16, and an excess drainage fluid bottle 18 also connected to the proportionator device 15.

The irrigation fluid supply bottle 10 contains a supply of an irrigating fluid 20 such as normal saline solution, antibiotic solution and the like. The bottle is closed to the surrounding atmosphere and is provided with a fluid outlet opening 21 adjacent the bottom of the bottle and with an air inlet opening 22 communicating with the atmosphere within the bottle 10 adjacent the top of the bottle. The fluid outlet opening 21 of the bottle is connected by means of a conduit 23, for example, a plastic tube or rubber tube, to the irrigation fluid inlet passageway of the two-way catheter 13. The conduit 23 is provided with means 11 for regulating the flow of fluid coming from the fluid supply bottle and means 12 for determining the rate of flow of irrigating fluid from the supply bottle. The means 11 for regulating the rate of flow of irrigating fluid advantageously comprises a conventional screw clamp adapted to pinch the rubber tube of the conduit 23 when the screw is tightened, and the means 12 for determining the rate of flow of irrigating fluid advantageously comprises a transparent plastic chamber or sight glass by which the number of drops 24 of fluid which fall or drip through the chamber or sight glass in one minute (or any other unit of time) can be determined.

The two-way rubber catheter 13 is of conventional construction and is commonly formed of anodically deposited latex rubber. The catheter 13 is provided with an irrigating fluid inlet passageway and with a drainage fluid outlet passageway both of which communicate at their inner ends with the interior of the organ 14 being irrigated. As previously noted, the outer end of the irrigating fluid inlet passageway of the catheter is connected to the irrigating fluid supply bottle 10 by means of the conduit 23. The outer end of the drainage fluid outlet passageway of the catheter 13 is connected by means of a drainage fluid conduit 25, advantageously formed from a rubber tube, to the drainage fluid proportionator device 15. Moreover, as previously mentioned, it is occasionally desirable to employ a combination of suprapubic catheter and conventional ureteral catheter in place of the aforementioned two-way catheter 13, the suprapubic catheter serving as the irrigating fluid inlet tube and the urethral catheter serving as the drainage fluid inlet tube and the urethral catheter serving as the drainage fluid outlet tube. Accordingly, in the interest of simplicity, the term "two-way catheter" as employed herein will be understood to refer not only to two-way catheters but also to the aforementioned combination of suprapubic and urethral catheters and to all such equivalent arrangements as well.

Drainage fluid removed or drained from the organ 14 by the catheter 13 consists of a mixture of irrigating fluid and body fluids, such as urine. The drainage fluid proportionator device 15 is adapted to divert from the main stream of drainage fluid and to direct to the associated air pressure equalizer chamber 16 an amount of the drainage fluid equal to the amount of irrigating fluid flowing from the irrigating fluid supply bottle 10 to the organ 14 being irrigated and to direct the balance of the drainage fluid through a drainage fluid overflow conduit 26 to the excess drainage fluid bottle 18. The amount of drainage fluid equal to the amount of irrigating fluid is hereinafter referred to as the drainage equalizing fluid, and the balance of the drainage fluid is hereinafter referred to as the excess drainage fluid. Moreover, as the amount of drainage equalizing fluid introduced into the equalizer chamber 16 is equal to the amount of irrigating fluid flowing from the irrigating fluid supply bottle 10 to the organ 14, it will be appreciated that the amount of excess drainage fluid flowing into the excess drainage fluid bottle 18 is a direct measure of the amount of urine or other bodily fluids removed from the organ 14 as a part of the drainage fluid withdrawn therefrom.

The proportionator device 15 can be of any suitable construction, and in the preferred embodiment of my invention shown in the drawing, it comprises a generally T-shaped structure of glass tubing the leg of which is advantageously disposed in a generally horizontal plane and the cross arm of which is disposed at an acute angle to this plane as shown in the drawing. A drainage fluid flow regulation clamp 19 is advantageously provided in the drainage fluid overflow conduit 26 so that, by appropriate adjustment thereof, an amount of drainage equalizing fluid equal to the amount of irrigating fluid can be made to flow from the proportionator device 15 through the equalizing fluid passageway 27 of the device, the excess drainage fluid flowing from the proportionator device through the excess drainage fluid passageway 28 of the device. That is to say, the drainage fluid regulator 19 is adjusted so that drops 29 of drainage equalizing fluid fall from the discharge end of the equalizing fluid passageway 27 at the same rate as drops 24 of the irrigating fluid fall through the sight glass 12 of my apparatus, the excess drainage fluid being discharged from the proportionator device through the excess drainage fluid passageway 28 thereof.

As noted, the drainage equalizing fluid discharged from the proportionator device 15 through the equalizing fluid passageway 27 is introduced directly into the air pressure equalizer chamber 16 associated with the proportionator device. The equalizer chamber 16 is closed to the surrounding atmosphere and is connected by a suitable conduit 30 to the air inlet opening 22 communicating with the atmosphere within the irrigating fluid supply bottle 10. Thus, as drainage equalizing fluid flows from the proportionator device 15 into the equalizer chamber 16, an amount of air equal to this amount of equalizing fluid is displaced from the equalizer chamber 16 and flows therefrom through the conduit 30 into the fluid supply bottle 10. The air thus introduced into the irrigating fluid supply bottle 10 replaces the irrigating fluid flowing from the supply bottle through the fluid outlet opening 21. As a result, irrigating fluid will continue to flow from the irrigating fluid supply bottle 10 as long as an equivalent amount of air continues to flow into the fluid supply bottle 10 from the equalizer chamber 16. However, should the flow of air from the equalizer chamber 16 to the fluid supply bottle 10 stop for any reason (for example, as a result of occlusion of the drainage fluid outlet passageway of the two-way catheter 13 which, in turn, would immediately result in cessation of the flow of drainage equalizing fluid into the equalizing chamber 16), the flow of irrigating fluid from the fluid supply bottle 10 into the organ 14 would soon stop due to the negative pressure that would quickly develop within the fluid supply bottle 10.

In the embodiment of my invention shown in Fig. 1, the air pressure equalizer chamber 16 is connected by means of an equalizing fluid conduit 32 to an equalizing fluid collection bottle 17 that is adapted to collect the drainage equalizing fluid diverted by the proportionator device 15 to the equalizer chamber 16. The equalizing fluid collection bottle 17 is closed to the surrounding atmosphere, and the atmosphere within the collection bottle 17 is connected by means of an auxiliary pressure equalizing conduit 33 to the atmosphere within the pressure equalizing chamber 16. In effect, the equalizing fluid collection bottle 17 is an extension for fluid collection purposes of the air pressure equalizer chamber 16. Thus, drainage equalizing fluid introduced into the equalizer chamber 16 by the proportionator device 15 flows from the equalizer chamber through the conduit 32 and is collected in the equalizing fluid collection bottle 17, and the air displaced by the equalizing fluid flowing into the equalizing fluid collection bottle 17 flows therefrom through the pressure equalizing conduit 33 to the pressure equalizer chamber 16 and from thence through the conduit 30 to the air inlet opening 22 of the irrigating fluid supply bottle 10. Therefore, the fluid supply bottle 10, the pressure equalizer chamber 16 and the equalizing fluid collection bottle 17 form a closed system in which the total amount of fluid (irrigation fluid and drainage equalizing fluid) remains substantially constant, and in which the air pressure within the system remains substantially the same throughout.

As also previously mentioned, the atmosphere within the equalizer chamber 16 is connected by the conduit 30 to the atmosphere within the irrigating fluid supply bottle 10. It is important to prevent contamination from any source of the irrigating fluid contained in the supply bottle 10. Therefore, it is desirable to sterilize the air that flows from the equalizer chamber 16 to the supply bottle 10 as a result of displacement of this air by the drainage equalizing fluid. Accordingly, means for sterilizing the air flowing from the equalizing chamber 16 to the supply bottle 10 are advantageously provided. Thus, in the embodiment of my invention shown in the drawing the equalizer chamber 16 communicates with an air sterilization chamber 35 containing a strong disinfectant or antiseptic solution 36 through which the air flowing from the equalizer chamber 16 to the supply bottle 10 must bubble or pass before entering the supply bottle 10.

The overflow fluid passageway of the proportionator device 15 is connected by the overflow fluid conduit 26 to the excess drainage fluid bottle 18. The bottle 18 is open to the atmosphere, and therefore means must be provided for preventing air from entering the proportionator device 15 through the overflow conduit 26. Accordingly, the discharge end of the overflow conduit 26 is advantageously immersed in the excess drainage fluid contained in the bottle 18, thereby providing a liquid seal which prevents entrance of atmospheric air into the overflow conduit 26 and from thence into the proportionator device 15.

In the preferred embodiment of my invention shown in the drawing, the proportionator device 15, the air pressure equalizer chamber 16 associated with the proportionator device, and the air sterilization chamber 35 associated with the equalizer chamber are structurally integrated to form a unique and novel piece of apparatus referred to herein as the fluid flow control device 37.

As shown best in Figs. 2 and 3, the fluid flow control device 37 is advantageously formed of glass or an equivalent transparent material. The T-shaped proportionator 15 of the fluid flow control device 37 is mounted on the side of the air pressure equalizer chamber 16 with the equalizing fluid passageway 27 of the proportionator 15 extending through the wall of the equalizer chamber 16 as shown best in Fig. 3. The air pressure equalizer chamber 16 is connected to the equalizing fluid collection bottle 17 in the manner hereinbefore described, the equalizing fluid conduit 32 being connected to the fluid outlet nipple 38 of the fluid flow control device 37 and the pressure equalizing conduit 33 being connected to the air inlet nipple 39 of the device 37. The air sterilization chamber 35 is disposed directly above the pressure equalizer chamber 16 and is connected thereto by the air outlet conduit 40. The conduit 40 is formed with a U-shaped bend so that the end of the conduit is immersed in the antiseptic solution 36 contained in the air sterilization chamber 35. The conduit 40 is also advantageously formed with an enlarged portion 41 which serves to deter backflow of antiseptic solution from the sterilizing chamber 35 into the equalizer chamber 16. Air displaced by the flow of drainage equalizing fluid into the equalizer chamber 16 flows therefrom through the air outlet conduit 40 and through the antiseptic solution 36 into the air sterilization chamber 35 of the fluid flow control device 37. The air sterilization chamber is provided with an air outlet nipple 42 by which it is connected to the air inlet opening 22 of the irrigating fluid supply bottle 10. The air sterilization chamber is also advantageously formed with a stoppered opening 43 by means of which antiseptic solution can be introduced into and withdrawn from the sterilization chamber 35.

The apparatus of my invention is employed for continuous irrigation of the bladder and other organs of the urinary tract by assembling the apparatus as shown in Fig. 1 of the drawing. The rate of flow of irrigating fluid 20 is regulated by appropriate adjustment of the screw clamp 11, and the rate of flow is determined by measuring the number of drops 24 of irrigating fluid flowing from the supply bottle 10 into the organ 14 being irrigated. After the flow of drainage fluid from the organ 14 has commenced, the position of the drainage fluid regulator clamp is adjusted so that the drops 29 of drainage equalizing fluid fall from the end of the equalizing fluid passageway 27 at the same rate as the drops 24 of irrigating fluid fall through the sight glass 12, any excess of drainage fluid beyond this amount flowing through the overflow fluid passageway 28 to the excess drainage fluid bottle 18. Drainage equalizing fluid introduced into the equalizer chamber 16 and from thence into the equalizing fluid collection bottle 17 displaces an amount of air equivalent to the amount of irrigating fluid flowing from the supply bottle 10 to the organ 14. The air displaced from the equalizer chamber 16 and the fluid collection bottle 17 flows therefrom through the air sterilization chamber 35 to the irrigating fluid supply bottle 10. As long as air continues to flow into the fluid supply bottle 10 from the equalizer chamber 16, the irrigating fluid will continue to flow from the supply bottle 10 to the organ 14 being irrigated. However, should the flow of air into the irrigating fluid supply bottle 10 stop due to occlusion of the drainage fluid outlet passageway of the two-way catheter 13, the flow of irrigating fluid from the supply bottle 10 to the organ 14 soon ceases. As a result, the possible serious consequences that might follow from occlusion of the discharge fluid outlet passageway of the catheter 13 are automatically avoided. When it is discovered that the flow of irrigating fluid has stopped due to occlusion of the discharge fluid outlet passageway of the catheter 13, the blockage or other cause of this occlusion is remedied and the irrigation of the organ 14 resumed.

From the foregoing, it will be seen that I have devised an important improvement in the art to which my continuous irrigation apparatus relates.

I claim:

1. In apparatus for continuous bladder irrigation comprising an irrigation fluid supply bottle having a fluid outlet opening at the bottom of the bottle and an air inlet opening adjacent the top of the bottle, means for regulating the flow of irrigating fluid and for determining the rate of fluid flow from the fluid supply bottle, and a two-way catheter having an irrigation fluid inlet passageway and a drainage fluid outlet passageway, the irrigation fluid inlet passageway of the catheter being connected to the irrigation fluid supply bottle, the improvement which comprises fluid flow control means connected to the drainage fluid outlet passageway of the catheter and adapted to shut off the flow of irrigation fluid from the fluid supply bottle to the catheter when the drainage fluid outlet passageway of the catheter becomes occluded, said fluid flow control means comprising a drainage fluid proportionator device adapted to divert and direct to a pressure equalizer chamber an amount of the drainage fluid equal to the amount of irrigation fluid withdrawn from the irrigation fluid supply bottle and to direct the balance of the drainage fluid to an excess drainage fluid collection bottle, the irrigation fluid supply bottle, the proportionator device and the equalizer chamber being closed to the surrounding atmosphere and the equalizer chamber being connected to the air inlet opening of the fluid supply bottle, the excess drainage fluid bottle being open to the surrounding atmosphere and being provided with air check means adapted to prevent entrance of atmosphere air into the proportionator device.

2. In apparatus for continuous bladder irrigation comprising an irrigation fluid supply bottle having a fluid outlet opening at the bottom of the bottle and an air inlet opening adjacent the top of the bottle, means for regulating the flow of irrigating fluid and for determining the rate of fluid flow from the fluid supply bottle, and a two-way catheter having an irrigation fluid inlet passageway and a drainage fluid outlet passageway, the irrigation fluid supply bottle being connected to the fluid inlet passageway of the catheter, the improvement which comprises fluid flow control means connected to the drainage fluid outlet passageway of the catheter and adapted to shut off the flow of irrigation fluid from the fluid supply bottle to the catheter when the drainage fluid outlet passageway of the catheter becomes occluded, said fluid flow control means comprising a drainage fluid proportionator device adapted to divert and direct to a pressure equalizer chamber and an associated fluid collection bottle an amount of the drainage fluid equal to the amount of irrigation fluid withdrawn from the irrigation fluid supply bottle and to direct the balance of the drainage fluid through a conduit to an excess drainage fluid bottle, the irrigating fluid supply bottle, the proportionator device, the equalizer chamber and the fluid collection bottle being closed to the surrounding atmosphere and the equalizer chamber being connected by conduits to the fluid collection bottle and to the air inlet opening of the fluid supply bottle, the excess drainage fluid bottle being open to the surrounding atmosphere and being provided with a liquid seal air check adapted to prevent entrance of atmosphere air into the conduit connected to the proportionator device.

3. In apparatus for continuous bladder irrigation comprising an irrigation fluid supply bottle having a fluid outlet opening at the bottom of the bottle and an air inlet opening adjacent the top of the bottle, means for regulating the flow of irrigating fluid and for determining the rate of fluid flow from the fluid supply bottle, and a two-way catheter having an irrigation fluid inlet passageway and a drainage fluid outlet passageway, the irrigation fluid supply bottle being connected to the fluid inlet passageway of the catheter, the improvement which comprises fluid flow control means connected to the drainage fluid outlet passageway of the catheter and adapted to shut off the flow of irrigation fluid from the fluid supply bottle to the catheter when the drainage fluid outlet passageway of the catheter becomes occluded, said fluid flow control means comprising a drainage fluid proportionator device adapted to divert and direct to a pressure equalizer chamber and an associated fluid collection bottle an amount of the drainage fluid equal to the amount of irrigation fluid withdrawn from the irrigation fluid supply bottle and to direct the balance of the drainage fluid through a drainage conduit to an excess drainage fluid bottle, the irrigating fluid supply bottle, the proportionator device, the equalizer chamber and the fluid collection bottle being closed to the surrounding atmosphere, the equalizer chamber being connected by conduits to the fluid collection bottle and to the air inlet opening of the fluid supply bottle, air sterilization means disposed in the conduit connecting the equalizer chamber to the fluid supply bottle, the excess drainage fluid bottle being open to the surrounding atmosphere and being provided with a liquid seal air check adapted to prevent entrance of atmosphere air into the overflow conduit connected to the proportionator device.

4. In apparatus for continuous bladder irrigation comprising an irrigation fluid supply bottle having a fluid outlet opening at the bottom of the bottle and an air inlet opening adjacent the top of the bottle, means for regulating the flow of irrigating fluid and for determining the rate of fluid flow from the fluid supply bottle, and a two-way catheter having an irrigation fluid inlet passageway and a drainage fluid outlet passageway, the irrigation fluid inlet passageway of the catheter being connected to the irrigation fluid supply bottle, the improvement which comprises a fluid flow control device connected to the drainage fluid outlet passageway of the catheter, said fluid flow control device comprising a drainage fluid proportionator mounted on and communicating with a pressure equalizer chamber, said drainage fluid proportionator being adapted to divert and direct to said pressure equalizer chamber an amount of the drainage fluid equal to the amount of irrigation fluid withdrawn from the irrigation fluid supply bottle and to direct the balance of the drainage fluid through a conduit to an excess drainage fluid bottle, the irrigation fluid supply bottle and the fluid flow control device being closed to the surrounding atmosphere, the equalizer chamber of the fluid flow control device being connected to the air inlet opening of the fluid supply bottle, and the excess drainage fluid bottle being open to the surrounding atmosphere and being provided with air check means adapted to prevent entrance of atmosphere air into the conduit connected to the proportionator of the fluid flow control device.

5. In apparatus for continuous bladder irrigation comprising an irrigation fluid supply bottle having a fluid outlet opening at the bottom of the bottle and an air inlet opening adjacent the top of the bottle, means for regulating the flow of irrigating fluid and for determining the rate of fluid flow from the fluid supply bottle, and a two-way catheter having an irrigation fluid inlet passageway and a drainage fluid outlet passageway, the irrigation fluid supply bottle being connected to the fluid inlet passageway of the catheter, the improvement which comprises a fluid flow control device connected to the drainage fluid outlet passageway of the catheter, said fluid flow control device comprising a drainage fluid proportionator mounted on and communicating with a pressure equalizer chamber and air sterilization means also mounted on and communicating with said pressure equalizer chamber, said drainage fluid proportionator being adapted to divert and direct to said pressure equalizer chamber an amount of the drainage fluid equal to the amount of irrigation fluid withdrawn from the irrigation fluid supply bottle and to direct the balance of the drainage fluid through an overflow fluid conduit to an excess drainage fluid bottle, the pressure equalizer chamber of the fluid flow control device being connected by at least one conduit to an equalizer fluid collection bottle and the air sterilization means of the fluid flow control device being connected by a conduit to the air inlet opening of the fluid supply bottle, the irrigating fluid supply bottle, the fluid flow control device and the equalizer fluid collection bottle being closed to the surrounding atmosphere, and the excess drainage fluid bottle being open to the surrounding atmosphere and being provided with air check means adapted to prevent entrance of atmosphere air into the overflow fluid conduit connect to the proportionator of the fluid flow control device.

6. Apparatus for continuous bladder irrigation comprising an irrigation fluid supply bottle having a fluid outlet opening at the bottom of the bottle and an air inlet opening adjacent the top of the bottle, means for regulaing the flow of irrigating fluid from the fluid supply bottle, means for determining the rate of fluid flow from the fluid supply bottle, a two-way catheter having an irrigation fluid inlet passageway and a drainage fluid outlet passageway, a conduit connecting the fluid supply bottle to the fluid inlet passageway of the catheter, a drainage fluid proportionator device, a drainage fluid conduit connecting the fluid outlet passageway of the catheter to the drainage fluid proportionator device, an air pressure equalizer chamber and an associated equalizer fluid collection bottle, and an excess drainage fluid collection bottle, said drainage fluid proportionator device being adapted to divert and direct to the pressure equalizer chamber and associated equalizer fluid collection bottle an amount of the drainage fluid equal to the amount of irrigation fluid withdrawn from the irrigation fluid supply bottle and to direct the balance of the drainage fluid through an overflow conduit to the excess drainage fluid collection bottle, the irrigation fluid supply bottle, the drainage fluid proportionator device, the pressure equalizer chamber and the equalizer fluid collection bottle being closed to the surrounding atmosphere, the pressure equalizer chamber being connected by a conduit to the air inlet opening of the fluid supply bottle, the excess drainage fluid collection being open to the surrounding atmosphere and being provided with air check means adapted to prevent entrance of atmosphere air into the overflow conduit connected to the proportionator device.

7. A fluid flow control device for use in continuous bladder irrigation comprising a drainage fluid proportionator mounted on a pressure equalizer chamber, said drainage fluid proportionator having a drainage fluid inlet passageway adapted to be connected to the drainage fluid discharge passageway of a two-way catheter, an equalizing fluid outlet passageway communicating with the interior of said pressure equalizer chamber and an excess drainage fluid discharge passageway adapted to be connected by a conduit to an overflow fluid bottle, said drainage fluid proportionator being adapted to divert a predetermined minimum amount of the drainage fluid entering the proportionator through the drainage fluid inlet passageway into the pressure equalizer chamber through the equalizing fluid outlet passageway and to direct the balance of the drainage fluid to the excess drainage fluid discharge passageway of said proportionator, said pressure equalizer chamber having an equalizing fluid discharge opening adapted to be connected to an equalizing fluid collection bottle, an equalizing air inlet opening adapted to be connected to the equalizing fluid collection bottle and an equalizing air outlet passageway adapted to be connected to the air inlet opening of an irrigation fluid supply bottle.

8. A fluid flow control device for use in continuous bladder irrigation comprising a drainage fluid proportionator mounted on and communicating with a pressure equalizer chamber and air sterilization means also mounted on and communicating with said pressure equalizer chamber, said drainage fluid proportionator having a drainage fluid inlet passageway, an equalizing fluid outlet passageway communicating with the interior of said pressure equalizer chamber and an excess drainage fluid discharge passageway, said proportionator being adapted to divert a predetermined minimum amount of the drainage fluid entering the proportionator into the pressure equalizer chamber through the equalizing fluid outlet passageway and to direct the balance of the drainage fluid from the proportionator through the excess drainage fluid discharge passageway, the pressure equalizer chamber having an equalizing fluid discharge opening, an equalizing air inlet opening and an equalizing air discharge passageway communicating with the interior of the air sterilization means, said air sterilization means being adapted to contain a supply of a disinfectant solution through which must bubble equalizing air entering the sterilization means from the equalizer chamber and having a sterilized equalizing air discharge opening.

References Cited in the file of this patent

UNITED STATES PATENTS

| | | |
|---|---|---|
| 2,313,516 | Leffert | Sept. 27, 1938 |
| 2,523,373 | Jennings | Sept. 26, 1950 |
| 2,602,448 | McKenna | July 8, 1952 |
| 2,860,636 | Seitchik | Nov. 18, 1958 |

UNITED STATES PATENT OFFICE

CERTIFICATE OF CORRECTION

Patent No. 2,919,695

January 5, 1960

Se Kyong Kim

It is hereby certified that error appears in the printed specification of the above numbered patent requiring correction and that the said Letters Patent should read as corrected below.

Column 2, line 63, strike out "and", second occurrence; column 9, line 11, after "collection" insert -- bottle --; column 10, line 32, list of References Cited, under UNITED STATES PATENTS, for the patent number "2,313,516" read -- 2,131,516 --.

Signed and sealed this 11th day of October 1960.

(SEAL)
Attest:
KARL H. AXLINE
Attesting Officer

ROBERT C. WATSON
Commissioner of Patents